United States Patent
Kaneko et al.

(10) Patent No.: US 6,788,024 B2
(45) Date of Patent: Sep. 7, 2004

(54) POSITION-SENSORLESS MOTOR CONTROL METHOD AND APPARATUS

(75) Inventors: Satoru Kaneko, Urizura (JP); Ryoso Masaki, Hitachi (JP); Takefumi Sawada, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/390,148

(22) Filed: Mar. 18, 2003

(65) Prior Publication Data

US 2004/0051495 A1 Mar. 18, 2004

(30) Foreign Application Priority Data

Sep. 18, 2002 (JP) .................................. 2002-270968

(51) Int. Cl.⁷ ............................................ H02P 5/28
(52) U.S. Cl. .................... 318/807; 318/254; 318/138; 318/439; 318/727; 318/700; 318/802
(58) Field of Search .............................. 318/807, 254, 318/138, 439, 727, 700, 802, 811

(56) References Cited

U.S. PATENT DOCUMENTS 5,929,400 A  *  7/1999  Colby et al. ............... 187/393
6,489,692 B1 * 12/2002  Gilbreth et al. ............. 290/52

FOREIGN PATENT DOCUMENTS

| JP | 7-245981 | 9/1995 |
| JP | 8-149898 | 7/1996 |

* cited by examiner

Primary Examiner—Karen Masih
(74) Attorney, Agent, or Firm—Crowell & Moring LLP (57) ABSTRACT

A provide a position-sensorless motor control apparatus comprises a salient-pole AC motor 2, a PWM inverter 3 for applying voltage to the AC motor 2, and a controller 1 for controlling the PWM inverter 3 by means of PWM signals, wherein the controller 1 has a position estimation means 11 which detects motor inductance in the pre-determined direction to the vector direction of the current that flows through the AC motor 2 and estimates the AC motor's rotor position based on the motor inductance.

15 Claims, 5 Drawing Sheets

POSITION-SENSORLESS MOTOR CONTROL METHOD AND APPARATUS

BACKGROUND OF THE INVENTION

1. Field of the Invention

The present invention relates to an AC (alternating current) motor control apparatus and specifically to a position-sensorless motor control method and apparatus that estimates and detects a magnetic pole position of a synchronous motor's rotor without needing a sensor thereby controlling the AC motor.

2. Description of Prior Art

Patent document 1: Japanese Application Patent Laid-open Publication No. Hei 07-245981; and Patent document 2: Japanese Application Patent Laid-open Publication No. Hei 08-149898.

To achieve highly responsive control of the speed or torque of a synchronous motor, technologies disclosed in those documents adopt vector controls that perform coordinate transformation of the motor current both in the magnetic flux direction (magnetic pole position direction, d-axis) and in the direction (q-axis) perpendicular to the magnetic flux direction based on the magnetic pole position of the motor's rotor. Since the control requires a sensor to detect a magnetic pole position, a magnetic pole position sensor is a requisite. However, recently, a variety of "magnetic pole position-sensorless control systems" have been developed to control a synchronous motor by detecting a magnetic pole position without using a position sensor.

In general, synchronous motors can be classified into two types: cylindrical types and salient-pole types (Ld≠Lq; Ld denotes inductance in the d-axis direction and Lq denotes inductance in the q-axis direction). Among them, a salient-pole synchronous motor's magnetic pole position estimation method includes a method that uses voltage induced by the motor and a method that uses the motor's salient-pole property.

For example, the prior art includes the patent document 1. This publication discloses a rotor position detection system that applies an alternating current voltage to a motor and separates the generated motor current into the parallel component direction and the perpendicular component direction to the alternating current voltage thereby detecting the rotor position based on the motor current components of at least one direction.

The prior art also includes the patent document 2. A primary winding's leakage inductance changes by influence of magnetic saturation in the teeth. Therefore, the technology disclosed in this document superimposes an alternating current voltage other than the fundamental wave component, measures the inductance of the winding based on the relation between the current's flow and the alternating current voltage, and then estimates magnetic flux from the inductance fluctuation. This documents describes the control of an inverter's output voltage and current according to the estimated magnetic flux.

The above prior art is theoretical based on the motor's salient-pole characteristic and provides an effective system that can accurately estimate a magnetic pole position by inputting the motor current.

SUMMARY OF THE INVENTION

The above prior art uses the characteristic that when an alternating current voltage is applied to a salient-pole motor, a current is also generated in the direction perpendicular to the alternating current voltage application vector when the application vector is not parallel to or perpendicular to the magnetic flux direction (d-axis). Therefore, by using the above characteristic, it is possible to estimate and detect the rotor position (magnetic pole position) using the salient-pole property in the area where motor current is relatively light and does not cause magnetic saturation.

However, in a heavy current area where motor current causes local magnetic saturation minimizing the inductance in the motor current direction, even when the application vector is parallel to or perpendicular to the magnetic flux direction (d-axis), a current also flows in the direction perpendicular to the alternating current voltage application vector. As a result, it may become impossible to estimate the position of the rotor by using the salient-pole property.

In view of the above, an object of the present invention is to provide a motor control method and apparatus which has a position estimation means that can accurately and reliably estimate the rotor position even when local magnetic saturation occurs in the motor current direction due to heavy current.

The above-mentioned problems can be solved by the following means:

A position-sensorless motor control method of controlling a PWM inverter for applying voltage to a salient-pole AC motor and controlling the AC motor, wherein vector control of the AC motor is performed by detecting motor inductance in the pre-determined direction to the detected current vector direction of the AC motor and estimating the AC motor's rotor position based on the detected motor inductance.

Further, the above-mentioned method applies voltage in the pre-determined direction to the AC motor's current vector direction to detect the rotor position, detects the current fluctuation condition caused by the applied voltage, detects inductance based on the detected current fluctuation condition, estimates and detects the AC motor's rotor position by using the detected inductance, thereby performing vector control of the AC motor.

Furthermore, the controller detects inductance in the direction perpendicular to the AC motor's current vector direction within the range determined in terms of detection accuracy of the motor's rotor position, estimates and detects the AC motor's rotor position based on the detected inductance, thereby performing vector control of the AC motor.

Moreover, the above-mentioned method applies voltage in the pre-determined direction to the AC motor's current vector direction to detect the rotor position, detects the current fluctuation condition caused by the applied voltage, calculates inductance based on the detected current fluctuation condition, estimates and detects the AC motor's rotor position, thereby performing vector control of the AC motor.

Furthermore, the above-mentioned method estimates and detects the AC motor's rotor position based on the difference between the detected current fluctuation condition and the reference current fluctuation condition calculated from the torque command and rotation speed, thereby performing vector control of the AC motor.

Moreover, this method is a position-sensorless motor control method wherein the pre-determined direction to the AC motor's current vector direction is the direction perpendicular to the current vector direction.

Furthermore, a motor control apparatus comprising a PWM inverter for applying voltage to a salient-pole AC motor and a controller for controlling the PWM inverter, wherein the controller comprises a means for applying a position detection voltage signal in the pre-determined direction to the AC motor's detected current vector direction and detecting the current fluctuation condition caused by the position detection voltage, a means for detecting the motor inductance from the detected current fluctuation, and a position estimation means for estimating the AC motor's rotor position based on the detected motor inductance, thereby performing vector control of the AC motor.

Further, the above-mentioned apparatus comprises a position estimation means for estimating and detecting the AC motor's rotor position based on the detected motor inductance and the reference inductance determined by the torque command and motor speed.

Further, the pre-determined direction is the direction perpendicular to the current vector direction.

Furthermore, the above-mentioned apparatus comprises a position estimation means for estimating the AC motor's rotor position based on the difference between the current fluctuation condition caused by the position detection voltage and the reference current fluctuation condition calculated from the torque command and rotation speed.

Moreover, the above-mentioned apparatus corrects the reference current fluctuation condition according to the magnitude of the input voltage of the PWM inverter.

Furthermore, the above-mentioned apparatus corrects the reference current fluctuation condition according to the operating point of the AC motor.

Moreover, the above-mentioned apparatus makes the reference current fluctuation condition into a table for each operating point of the AC motor or a table according to the magnitude of the PWM inverter's input voltage and stores the table in the controller.

Further, a motor control apparatus comprising a PWM inverter for applying voltage to a salient-pole AC motor and a controller for controlling the PWM inverter, wherein the controller comprises a position estimation means for detecting motor inductance in the direction 45 degrees to the magnetic flux axis and estimating the AC motor's rotor position based on the detected motor inductance.

Furthermore, the above-mentioned apparatus comprises a position estimation means for estimating the AC motor's rotor position based on the current fluctuation condition detected by applying a position detection voltage signal in the direction 45 degrees to the magnetic flux axis.

Moreover, the above-mentioned apparatus comprises a position estimation means for estimating the AC motor's rotor position based on the difference between the detected current fluctuation condition and the reference current fluctuation condition.

EXPLANATION OF SYMBOLS

1: Controller, 2: AC motor, 3: PWM inverter, 4: Current command generator, 5: Current control section, 6: Three-phase converter, 7: PWM signal generator, 8u, 8v, 8w: Current sensor, 9: Current detector, 10: dq converter, 11: Position estimation means, 12: Speed calculator, 13: Application direction switching means, 15: Voltage signal calculator, 16: Current fluctuation calculator, 20: Reference current fluctuation determination section, 21: Position identifier

DESCRIPTION OF THE PREFERRED EMBODIMENTS

Figure 1:
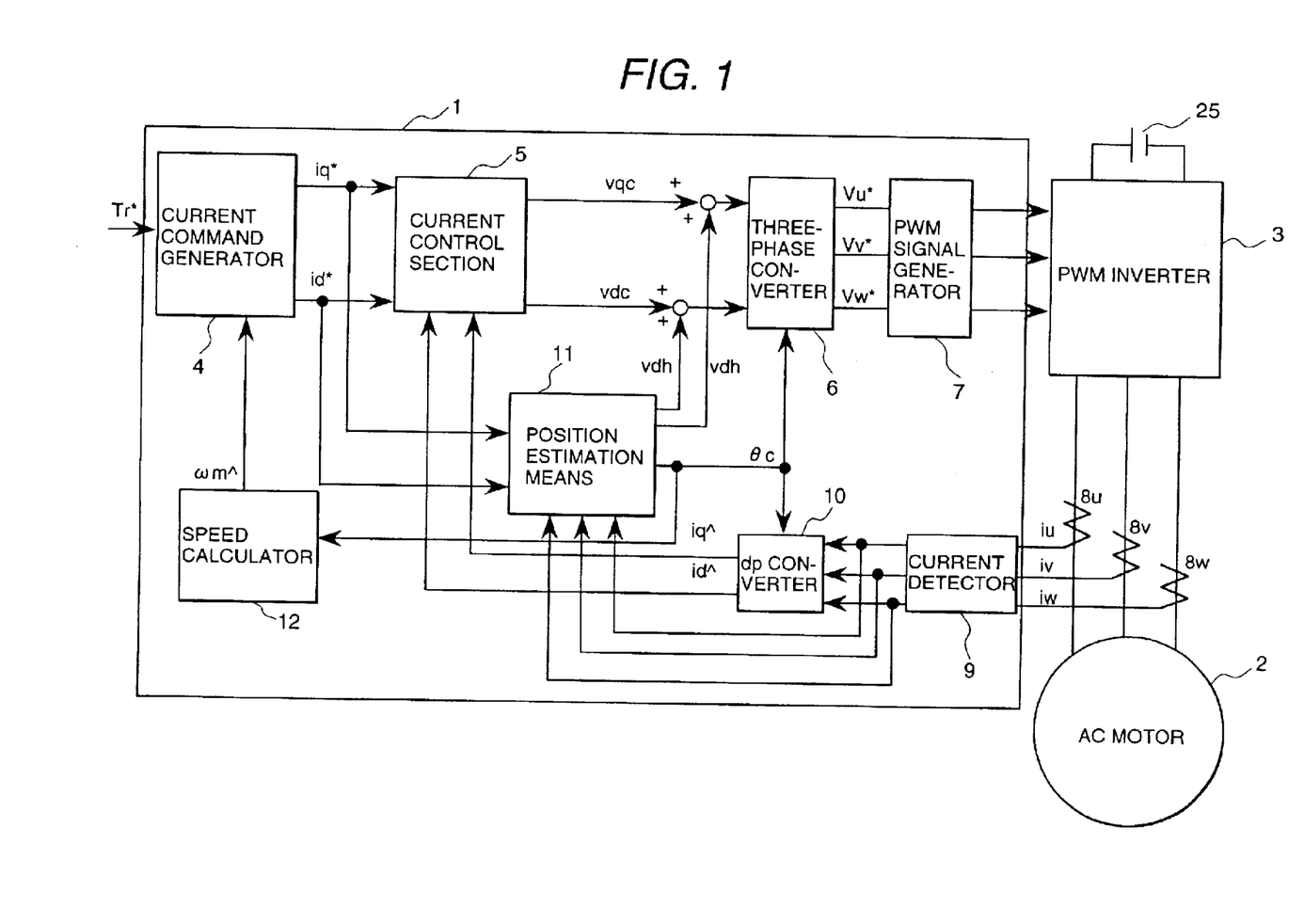
FIG. 1 is a schematic diagram that illustrates a motor control apparatus which is a first embodiment of the present invention.

Hereafter, an embodiment of the present invention will be described with reference to FIG. 1. FIG. 1 is a schematic diagram that illustrates a motor control apparatus which is a first embodiment of the present invention. First, configuration of a motor control system will be described. A controller 1 inputs torque command Tr* and outputs a signal sent by a PWM signal generator 7 to a PWM inverter 3 so that an AC motor 2 can generate torque specified by the command. At this point, a current command generator 4 located in the controller 1 inputs torque command Tr* and motor speed $\omega m\hat{}$ to determine the current commands iq* and id* so that maximum efficiency can be obtained at the current operating point. Herein, id* denotes a current command for the direction (d-axis) of the motor rotor's magnetic flux and iq* denotes a current command for the direction (q-axis) perpendicular to the motor rotor's magnetic flux direction.

Figure 2:
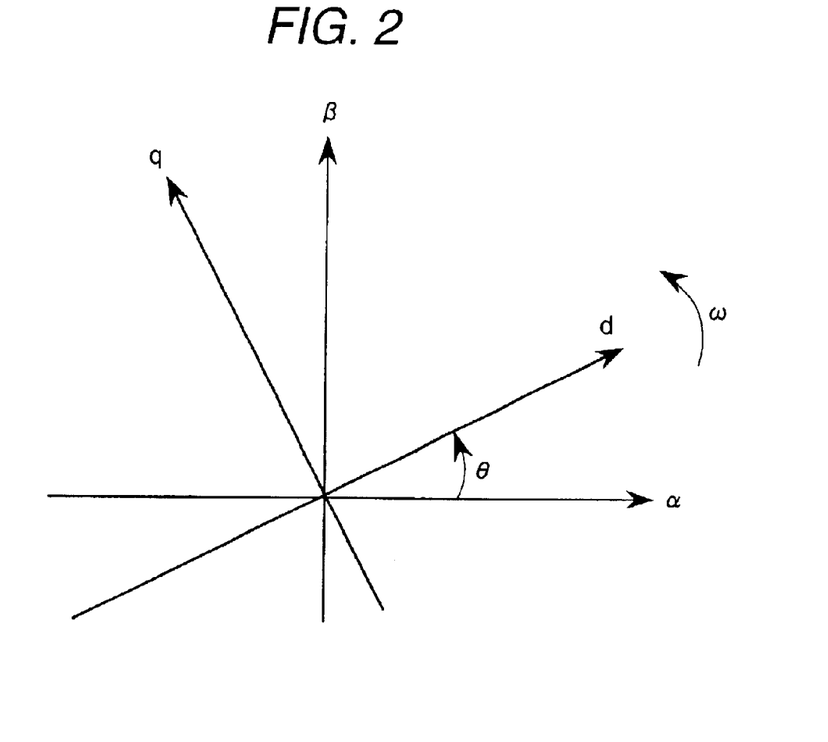
FIG. 2 shows the relation between the rotating coordinate system (d- and q-axes) and the coordinate system at rest ($\alpha$-$\beta$ axes).

The above-mentioned d- and q-axis coordinates are rotating coordinate systems as shown in FIG. 2. The coordinate systems rotate at motor angular speed $\omega$ to the coordinate system at rest $\alpha$-$\beta$ axes (two-phase coordinates converted from U, V, and W phases). Herein, let the phase from the reference $\alpha$-axis towards the direction (d-axis) of the motor rotor's magnetic flux be rotor position (magnetic pole position) $\theta$. As shown in FIG. 1, in this embodiment, a current control section 5 performs current control calculation on the rotating coordinate d- and q-axes to determine voltage commands Vdc and Vqc on the d- and q-axes. Thus, the current control of the d- and q-axis coordinates makes it possible to accurately control both the magnetic flux direction current and the current (acting on torque) perpendicular to the magnetic flux direction current, thereby enabling control of the motor torque and magnetic flux.

Further, a three-phase converter 6 performs coordinate transformation from the d- and q-axes to the U, V, and W phases to obtain three-phase alternating current voltage commands Vu*, Vv*, and Vw*. A PWM signal generator 7 converts the alternating current voltage command signals Vu*, Vv*, and Vw* into PWM signals to apply them to the PWM inverter 3. Furthermore, a current detector 9 located in the controller 1 imports motor currents iu, iv, and iw detected by three-phase current sensors 8u, 8v, and 8w, and a dq converter 10 calculates currents id$\hat{}$ and iq$\hat{}$ detected on the d- and q-axes and then feeds the result back to the current control section 5. The above is the configuration of the motor control system and is also a control method, generally called "vector control".

Coordinate transformation formulas used in the three-phase converter 6 and the dq converter 10 are expressed by Equations 1 and 2. The former is a calculation formula that converts (three-phase converter 6) d- and q-axis voltages Vd* and Vq* into three-phase voltages Vu*, Vv*, and Vw*, and the latter is a calculation formula that converts (dq converter 10) three-phase currents iu, iv, and iw into d- and q-axis currents iq^ and id^.

Equation 1

$$\begin{bmatrix} Vu^* \\ Vv^* \\ Vv^* \end{bmatrix} = \sqrt{(2/3)} \begin{bmatrix} 1 & 0 \\ -1/2 & \sqrt{(3)/2} \\ -1/2 & \sqrt{(3)/2} \end{bmatrix} \begin{bmatrix} \cos\theta & -\sin\theta \\ -\sin\theta & \cos\theta \end{bmatrix} \begin{bmatrix} Vd^* \\ Vq^* \end{bmatrix} \quad (1)$$

Equation 2

$$\begin{bmatrix} id^\wedge \\ iq^\wedge \end{bmatrix} = \begin{bmatrix} \cos\theta & -\sin\theta \\ -\sin\theta & \cos\theta \end{bmatrix} \sqrt{(2/3)} \begin{bmatrix} 1 & -1/2 & -1/2 \\ 0 & \sqrt{(3)/2} & -\sqrt{(3)/2} \end{bmatrix} \begin{bmatrix} iu \\ iv \\ iw \end{bmatrix} \quad (2)$$

As shown in those formulas, coordinate transformation requires rotor position θ (θC). Conventionally, to detect this rotor position, a position-sensor is used. However, currently, to reduce system costs and attain high reliability, position-sensorless systems that do not require a position sensor have been developed. To achieve such position-sensorless systems, several different position estimation methods have been developed.

Generally, an induced voltage based method is applied to the motor's high and medium speed range where induced voltage can be detected (estimated). However, a method that utilizes the motor's salient-pole property (Ld≠Lq) is applied to the motor's stop and low speed range where induced voltage is not easily detected. Herein, Ld denotes the d-axis direction inductance, Lq denotes the q-axis direction inductance, and the relation when Lq is greater than Ld is called "reverse salient-pole property". The characteristic of the inductance of a reverse salient-pole motor is shown in FIG. 3 as an example.

Figure 3:
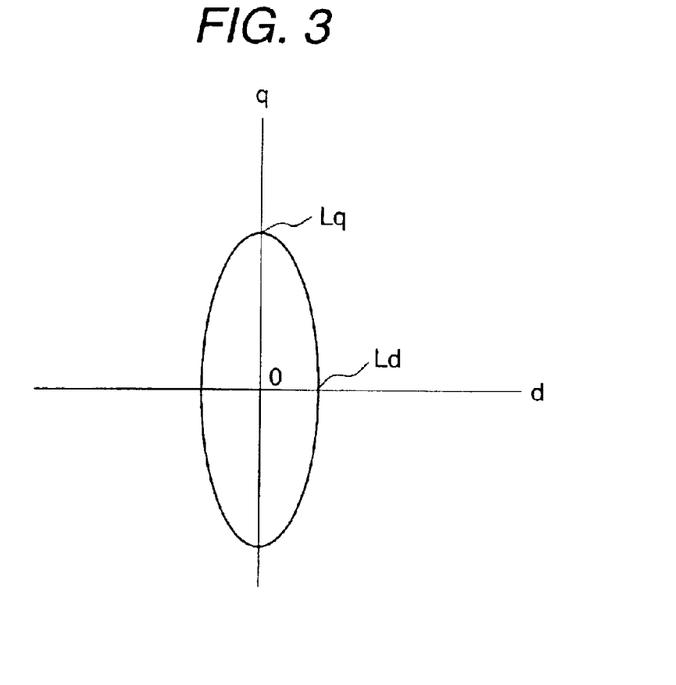
FIG. 3 shows the inductance characteristic of the motor.

FIG. 3 shows the magnitude of the inductance on the d- and q-axis directions (the distance from the ellipse center 0 to the circumference indicates the magnitude of the inductance). In a reverse salient-pole motor, the magnetic flux direction inductance Ld becomes minimized and the inductance Lq in the direction perpendicular to the magnetic flux direction becomes maximized. To detect (estimate) the magnetic pole position by using such a salient-pole property, a magnetic pole position detection voltage signal is applied (superimposed) to the motor, fluctuation of the generated motor current is detected, and the inductance is measured. The direction in which thus measured inductance becomes minimized is the rotor's magnetic flux direction (magnetic pole position). Furthermore, in a reverse salient-pole motor, when a voltage signal is applied to the magnetic flux direction or the direction perpendicular to the magnetic flux direction, if a position error is included in the voltage signal application direction, interfering current fluctuation occurs in the direction perpendicular to the voltage signal application direction. There is a method that detects this interfering current fluctuation and estimates a position error in the voltage signal application direction.

Figure 4:
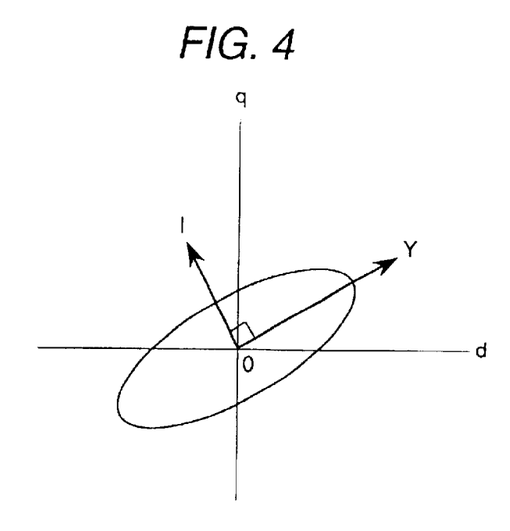
FIG. 4 shows the inductance distribution when magnetic saturation occurs in the motor current vector direction.

However, the above position estimation and detection by using a salient-pole property can be performed only when the motor's inductance characteristic is as shown in FIG. 3. That is the case when rotor's magnetic flux direction (d-axis) inductance or inductance of the direction (q-axis) perpendicular to the magnetic flux direction is minimized (or maximized) even though magnetic saturation occurs due to the current. On the contrary, in a high power density motor used for electric vehicles, hybrid cars, etc., magnetic saturation occurs in the current vector direction in a high load area where heavy current flows, and the d-axis direction inductance does not become minimized. FIG. 4 shows the inductance distribution in such a case.

In FIG. 4, "I" represents the current vector. As shown in the drawing, the current vector I causes magnetic saturation, which minimizes the direction's inductance. If a position estimation method based on the above-mentioned salient-pole property is applied when such a characteristic is occurring, the estimated position is not in the d-axis direction, but in the current vector direction. As a result, it may not be possible to accurately estimate the magnetic pole position.

Therefore, a magnetic pole position detection (estimate) method, described hereafter, is applied in such a situation. The basic concept of the method is to detect inductance in the direction where no magnetic saturation has occurred and to detect (estimate) the rotor's position based on the inductance. For example, if current vector I has caused magnetic saturation, which greatly decreases the inductance in that direction, the direction that is least affected by the magnetic saturation is the direction perpendicular to the current vector I (Y direction in FIG. 4). The inductance of this Y-axis direction (direction perpendicular to the current vector) is the motor inductance that is not affected by magnetic saturation and changes according to the motor's rotor position. Therefore, measuring inductance of the direction perpendicular to the current vector I by using this characteristic makes it possible to estimate the current rotor position. In FIG. 1, a position estimation means 11 detects (estimates) the rotor position.

In this control system, the position estimation means 11 outputs the position detection value θc that is applicable to coordinate transformation calculations in the three-phase converter 6 and the d-q converter 10. Furthermore, motor speed ωm^ can be obtained by calculating the rate of change over time of the position detection value θc by using a speed calculator 12.

Next, operations of the position estimation means 11 will be described. First, current commands id* and iq* on the d- and q-axis coordinates are input and the direction (X-axis) of the current vector I is calculated by the current commands id* and iq*. Furthermore, a position detection voltage signal is applied to the direction perpendicular to the current vector I, and inductance is obtained from current fluctuation caused by this applied voltage. Current fluctuation in the direction perpendicular to the current vector I is not easily affected by magnetic saturation and indicates the motor's original inductance value.

Since inductance of a salient-pole motor changes according to the rotor position, it is possible to determine the magnetic pole position according to the obtained inductance. In the control system shown in FIG. 1, the position estimation means 11 outputs the position detection value θc to use it for the coordinate transformation calculations in the three-phase converter 6 and the dq converter 10. Furthermore, motor speed ωm^ can be obtained by calculating the rate of change over time of the position detection value θc by using a speed calculator 12. The above is the basic configuration and operations of the position-sensorless control system when heavy current causes magnetic saturation in the current vector direction.

Figure 5:
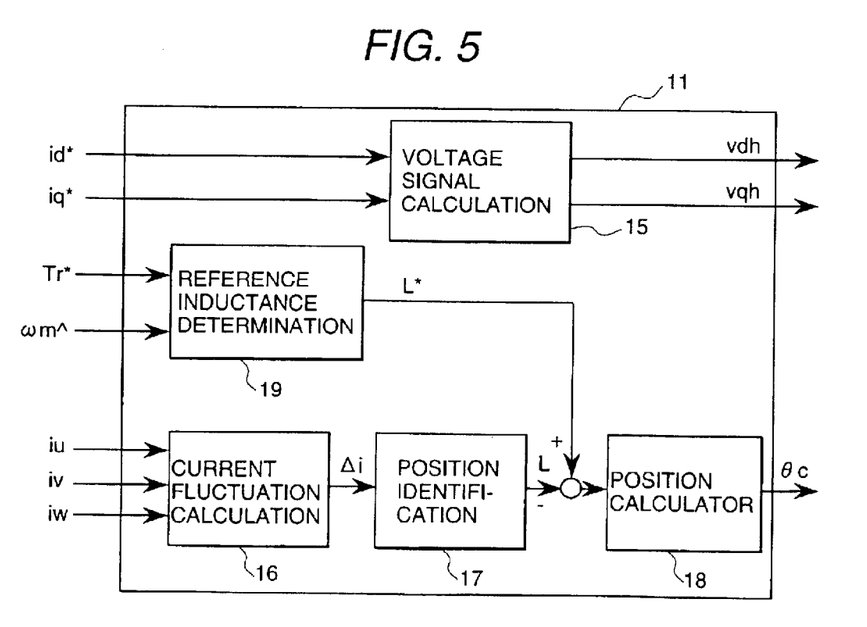
FIG. 5 shows a configuration example of a magnetic pole position estimation means that uses inductance.

Further explanation will be provided about the position estimation means 11. The configuration is described below. FIG. 5 illustrates an example of configuration of the position estimation means. As shown in FIG. 1, current commands id* and iq* are input to calculate the direction of current vector I. Furthermore, since an actual motor current is controlled by current commands id* and iq* on the control coordinates due to current control, it is possible to input feedback current values id^ and iq^ instead of inputting the current commands. And the voltage signal calculator 15 calculates and determines position estimation voltage signals vdh and vqh that are to be applied to the motor.

Herein, the position estimation voltage signals (vdh, vqh) are for measuring the inductance of the motor, and generally are rectangular wave pulse signals. A voltage signal calculator 15 calculates pulse frequency and amplitude as well as an application direction.

This embodiment explains that the direction which is least affected by magnetic saturation caused by the motor current is the direction perpendicular to current vector I. However, the direction for applying a position detection voltage signals is not only the direction perpendicular to the current vector I. Furthermore, a current fluctuation calculator 16 detects current fluctuation Δi caused by the application of voltage signals. An inductance calculator 17 inputs the current fluctuation Δi and calculates motor inductance L in the voltage signal application direction according to Equation 3.

Equation 3

$$L = V \cdot (\Delta t / \Delta i) \quad (3)$$

Herein, V denotes applied voltage and Δt denotes current fluctuation measuring time.

In FIG. 5, a reference inductance determination section 19 inputs torque command Tr* and speed detection value ωm^ to determine reference inductance L*. Then, a position calculator 18 calculates position estimation value θc based on the deviation between the reference inductance L* and the motor inductance L calculated by the inductance calculator 17. Herein, the value of inductance L* determined by a reference inductance determination section 19 is the value of the inductance in the direction perpendicular to the current vector I when a position error is zero. If an error occurs in the magnetic pole position estimation value, the detected inductance L becomes different from the reference inductance L*, which makes position estimation possible. A rotor position calculator 18 performs proportional and integral operations, for example, to adjust (correct) the position estimation value so that the deviation between the reference inductance L* and the motor inductance L becomes zero. Moreover, the calculation time can be reduced by beforehand measuring the reference inductance L* in each operating point, making the values into a table, and storing them in the memory. The above is the configuration example of the position estimation means 11 and its operations.

Figure 6:
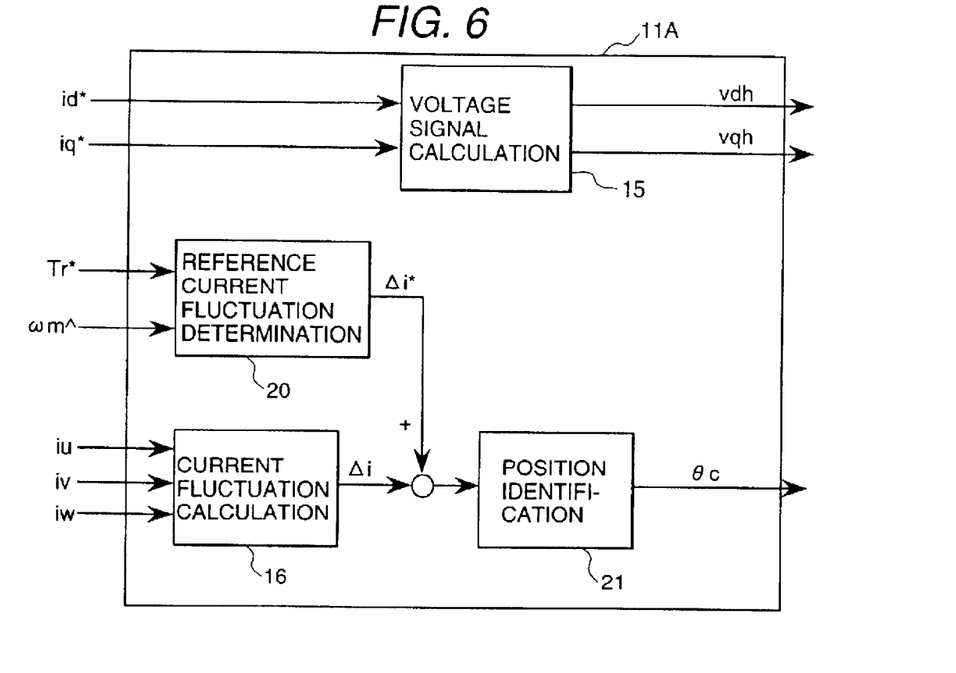
FIG. 6 shows an example of a detection method that uses current fluctuation $\Delta i$ which is a configuration example of a magnetic pole position estimation means.

Next, another configuration example 11A of the position estimation means 11 will be described with reference to FIG. 6. Similar to the voltage signal calculator in FIG. 5, a voltage signal calculator 15 in FIG. 6 calculates voltage pulse that is to be applied in the pre-determined direction to the motor's current vector I. Furthermore, a current fluctuation calculator 16 calculates current fluctuation Δi which is the same operation as conducted in the FIG. 5. As mentioned above, by applying voltage signals in the direction perpendicular to the current vector I, it is possible to measure the inductance of the motor without being affected by magnetic saturation caused by a current. In this configuration example, a method for calculating a position estimation value θC is different from the method described in said configuration example. This configuration example uses a method that estimates the magnetic pole position by using the current fluctuation condition instead of obtaining inductance.

First, a reference current fluctuation determination section 20 inputs torque command Tr* and speed detection value ωm^ to determine reference current fluctuation Δi* according to the current operating point. Herein, the value of reference current fluctuation Δi* determined by the reference current fluctuation determination section 20 is the value of current fluctuation in the direction perpendicular to current vector I when a position error is zero. If an error occurs in the magnetic pole position estimation value, the detected current fluctuation Δi becomes different from the reference current fluctuation Δi*, which makes position estimation possible. Furthermore, the calculation time can be reduced by beforehand measuring reference current fluctuation Δi* in each operating point, making the values into a table, and storing them in the memory. Moreover, the current fluctuation calculator 16 detects current fluctuation Δi generated by application of voltage signals, which is the same operation as conducted by the current fluctuation calculator in FIG. 5.

Figure 7:
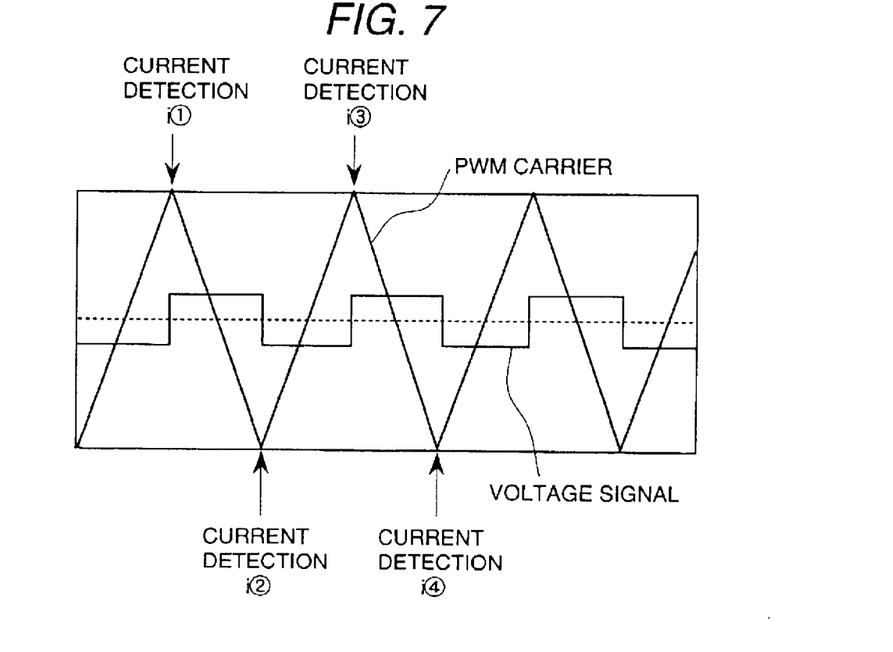
FIG. 7 shows a configuration example in which the rotor position is obtained based on inductance.

Next, FIG. 7 shows an example of a method for detecting current fluctuation Δi. Usually, an A/D converter built in the controller detects motor current at the peak or valley of the PWM carrier (in some cases, it is detected at both the peak and valley). Therefore, assuming that a voltage signal applied for position detection is synchronous with the PWM carrier (approximately 8.5 kHz), as shown in FIG. 7, it is possible to calculate Δi by calculating the difference between detected consecutive current values (Δi1=i②–i①, Δi2=i③–i②, Δi3=i④–i③ in FIG. 7).

Furthermore, the voltage signal, as shown in FIG. 7, is alternated every period, for example, between the direction (X) of current vector I and the direction (Y) perpendicular to the current vector I. Moreover, the amount of detected current fluctuation includes components of induced voltage and flowing electric current in addition to components of the applied voltage. To eliminate components other than the applied voltage, the difference between consecutive current fluctuation amounts (e.g. Δi1 and Δi2) is obtained. Thus, the amount of the current fluctuation caused by application of the voltage can be obtained.

Next, a position identifier 21 performs feedback control so that detected current fluctuation Δi coincides with reference current fluctuation Δi*. Assuming that the output of this feedback control is position estimation value θc, the motor's rotor position θ coincides with the position estimation value θC at the point where Δi* is equal to Δi. That is, it is possible to estimate the rotor position. Similar to the position calculator 18, a position identifier 21 performs control so that the reference current fluctuation Δi* coincides with the current fluctuation Δi by performing proportional and integral operations. Assuming that the output of this feedback control is position estimation value θC, the motor's rotor position θ coincides with the position estimation value θC at the point where Δi* is equal to Δi. That is, it is possible to estimate the rotor position.

Moreover, when this feedback control is performed, the compensation direction (phase increase and decrease direction) of the position estimation value θC is different during motor running than during regeneration. Therefore, the controller 1 determines whether the motor's current operating point is power running or regeneration and then switches the compensation direction.

Furthermore, the explanation of the embodiment shows that the application direction of the position detection voltage signal is not only the direction perpendicular to the current vector I. For example, in FIG. 8, the reference current fluctuation Δi* changes according to the deviation angle to the direction (i.e. Y-axis direction) perpendicular to current vector I. The current fluctuation sensitivity tends to decrease in the directions other than the Y-axis direction regardless of a lead or lag position. Therefore, the accuracy of magnetic pole position detection changes accordingly. That is, because the sensitivity is high in the Y-axis (perpendicular) direction, the accuracy of position detection by feedback control increases. However, as the detection sensitivity decreases, the position detection error increases. A broken line in FIG. 8 expresses changes in the detection error. The detection error is minimized in the Y-axis direction and increases in other directions regardless of a lead or lag position.

Figure 8:
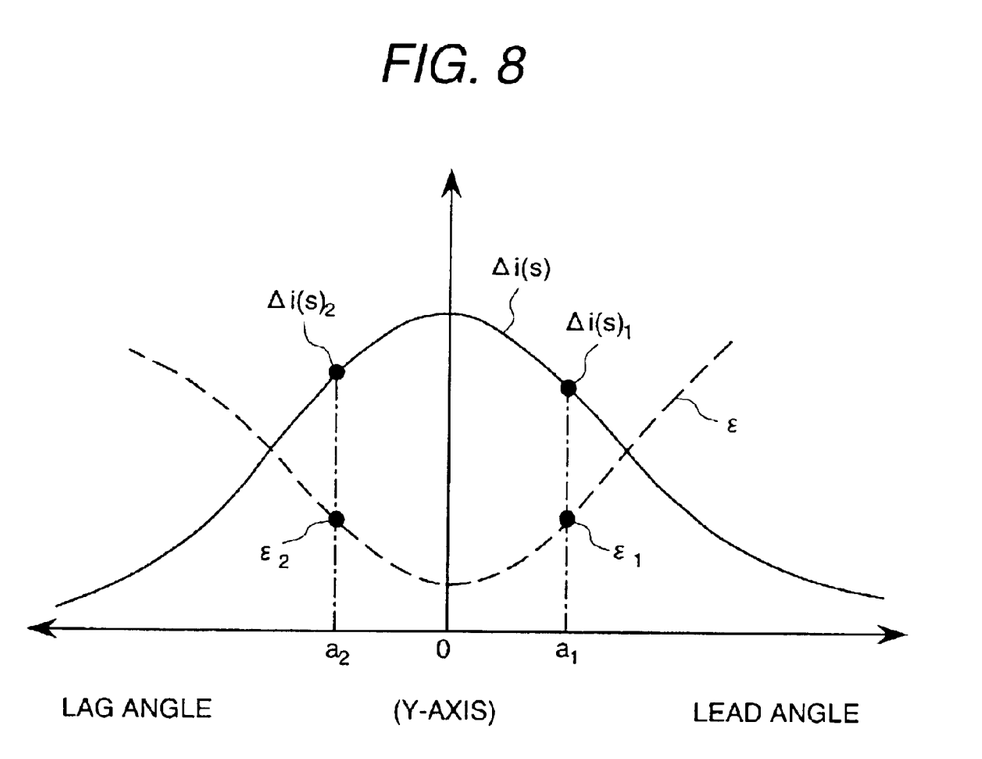
FIG. 8 shows the relation among the deviation from the direction perpendicular to the current vector I, detection accuracy, and current fluctuation sensitivity.

However, when high accuracy is not required, it is not necessary to obtain the accurate direction perpendicular to the current vector I. An arbitrary direction is acceptable if it is within an allowable accuracy range. The example in FIG. 8 shows that allowable errors, which are $\epsilon_1$ or less or $\epsilon_2$ or less, can be detected in the range between lead angle a1 or lag angle a2 and the Y-axis. At that time, feedback control is performed based on the reference current fluctuation $\Delta i_1*$ and $\Delta i_2*$.

So far, explanations have been given about the configuration example of the position estimation means 11 and operations of other configuration examples. Moreover, the present invention applies voltage signals, calculates motor inductance based on the current fluctuation at that moment, and estimates the rotor position. Therefore, for this calculation, it is necessary to obtain accurate voltage signals to be applied for the position detection. Since voltage output by the PWM inverter 3 changes gain according to input voltage of the direct current input voltage (battery Vb), it is necessary to correct the reference current fluctuation Δi according to the fluctuation of direct current voltage, when necessary.

Furthermore, an explanation has been given that the position estimation method according to the present invention is not affected by magnetic saturation caused by heavy current. Also, the position estimation method is applicable to the light current area where magnetic saturation has not occurred. However, when current is light and it is difficult to calculate the direction perpendicular to the current vector, this method applies position detection voltage signals in the direction 45 degrees from the magnetic flux axis configured in the control system, and estimates the magnetic pole position based on inductance or the current fluctuation condition in that direction. This is because inductance fluctuation is maximized (highest sensitivity) in the direction 45 degrees from the magnetic flux axis, compared to the fluctuation at the rotor position.

Furthermore, this embodiment inputs three-phase (U, V, W) motor currents iu, iv, and iw. However, two-phase motor current can also be used with this invention.

According to the present invention, even when local magnetic saturation occurs due to heavy current, it is possible to accurately estimate the position of the motor's rotor, thereby making a position-sensorless motor control apparatus available.

What we claim is:

1. A position-sensorless motor control method of controlling a PWM inverter for applying voltage to a salient-pole AC motor and controlling said AC motor, wherein vector control of said AC motor is performed by detecting motor inductance in the pre-determined direction to the detected current vector direction of said AC motor and estimating said AC motor's rotor position based on said detected motor inductance.

2. A position-sensorless motor control method according to claim 1, wherein voltage is applied in the pre-determined direction to said AC motor's current vector direction to detect the rotor position, the current fluctuation condition caused by said applied voltage is detected, inductance is detected based on said detected current fluctuation condition, and said AC motor's rotor position is estimated and detected by using the detected inductance, thereby vector control of said AC motor is performed.

3. A position-sensorless motor control method according to claim 1, wherein said controller detects inductance in the direction perpendicular to said AC motor's current vector direction within the range determined in terms of detection accuracy of the motor's rotor position, estimates and detects said AC motor's rotor position based on said detected inductance, thereby performing vector control of said AC motor.

4. A position-sensorless motor control method according to claim 3, wherein said AC motor's rotor position is estimated and detected based on the difference between said detected current fluctuation condition and the reference current fluctuation condition calculated from the torque command and rotation speed, thereby vector control of said AC motor is performed.

5. A position-sensorless motor control method according to claim 1, wherein the pre-determined direction to said AC motor's current vector direction is the direction perpendicular to said current vector direction.

6. A position-sensorless motor control apparatus comprising a PWM inverter for applying voltage to a salient-pole AC motor and a controller for controlling said PWM inverter, wherein said controller comprises a means for applying a position detection voltage signal in the pre-determined direction to said AC motor's detected current vector direction and detecting the current fluctuation condition caused by said position detection voltage, a means for detecting said motor inductance from said detected current fluctuation, and a position estimation means for estimating said AC motor's rotor position based on said detected motor inductance, thereby performing vector control of said AC motor.

7. A position-sensorless motor control apparatus according to claim 6, wherein a position estimation means estimates and detects said AC motor's rotor position based on the detected motor inductance and the reference inductance determined by the torque command and motor speed.

8. A motor control apparatus according to claim 6, wherein the pre-determined direction is the direction perpendicular to said current vector direction or the direction allowable in terms of detection accuracy.

9. A position-sensorless motor control apparatus according to claim 6, wherein a position estimation means estimates said AC motor's rotor position based on the difference between the current fluctuation condition caused by said position detection voltage and the reference current fluctuation condition calculated from the torque command and rotation speed.

10. A position-sensorless motor control apparatus according to claim 9, wherein said reference current fluctuation condition is corrected according to the magnitude of the input voltage of said PWM inverter.

11. A position-sensorless motor control apparatus according to claim 9, wherein said reference current fluctuation condition is corrected according to the operating point of said AC motor.

12. A position-sensorless motor control apparatus according to claim 9, wherein said reference current fluctuation condition is made into a table for each operating point of said AC motor or a table according to the magnitude of the PWM inverter's input voltage and stored in said controller.

13. A position-sensorless motor control apparatus comprising a PWM inverter for applying voltage to a salient-pole AC motor and a controller for controlling said PWM inverter, wherein said controller comprises a position estimation means for detecting motor inductance in the direction 45 degrees to the magnetic flux axis and estimating said AC motor's rotor position based on said detected motor inductance.

14. A position-sensorless motor control apparatus according to claim 13, wherein a position estimation means estimates said AC motor's rotor position based on the current fluctuation condition detected by applying a position detection voltage signal in the direction 45 degrees to said magnetic flux axis.

15. A position-sensorless motor control apparatus according to claim 14, wherein a position estimation means estimates said AC motor's rotor position based on the difference between said detected current fluctuation condition and said reference current fluctuation condition.

* * * * *